United States Patent [19]

Miura et al.

[11] Patent Number: 4,731,619

[45] Date of Patent: Mar. 15, 1988

[54] THERMAL PRINTING HEAD

[75] Inventors: Kunihiko Miura, Hiratsuka; Takashi Shimazaki, Yokohama, both of Japan

[73] Assignee: Kabushiki Kaisha Toshiba, Kawasaki, Japan

[21] Appl. No.: 883,715

[22] Filed: Jul. 9, 1986

[30] Foreign Application Priority Data

| | | | |
|---|---|---|---|
| Jul. 18, 1985 | [JP] | Japan | 60-159129 |
| Jul. 26, 1985 | [JP] | Japan | 60-165362 |
| Sep. 12, 1985 | [JP] | Japan | 60-203176 |

[51] Int. Cl.[4] .......... G01D 15/10

[52] U.S. Cl. .......... 346/76 PH; 346/140 R; 400/120; 219/216

[58] Field of Search .......... 346/76 PH, 76 L, 75, 346/140 PH; 400/120; 219/216 PH

[56] References Cited

U.S. PATENT DOCUMENTS

| | | | |
|---|---|---|---|
| 4,423,425 | 12/1983 | Reese et al. | 346/76 PH |
| 4,506,272 | 3/1985 | Arai | 346/76 PH |
| 4,561,789 | 12/1985 | Saito | 400/120 |
| 4,573,059 | 2/1986 | Shinma et al. | 346/76 PH |

*Primary Examiner*—E. A. Goldberg

*Assistant Examiner*—Linda M. Peco

*Attorney, Agent, or Firm*—Finnegan, Henderson, Farabow, Garrett & Dunner

[57] ABSTRACT

In a thermal head according to the present invention, a rod-like member having a circular cross-section is mounted on a support member. An array of heating elements is provided on the rod-like member. Drive signal side electrodes and driving power source side electrodes are connected to each heating element. The drive signal side electrodes are connected to a driver integrated circuit (IC). The driving power source side electrodes are connected in common at ends thereof to provide a common electrode. The common electrode extends along the outer circumferential surface of the rod-like member, is exposed on the side of the driver IC along the surface of the rod-like member opposing the support member, and is connected to a driving power source pattern on the side of the driver IC. A thermistor for detecting a temperature is provided in the vicinity of the rod-like member.

13 Claims, 25 Drawing Figures

THERMAL PRINTING HEAD

BACKGROUND OF THE INVENTION

This invention relates to a thermal head and, in particular, to a thermal printing/recording device such as a printer or a facsimile adopting the thermal head printing method, the thermal transfer printing method, or the thermal ink-jet printing method.

A thermal head has, on a ceramic substrate subjected to a glass-glazing treatment, a plurality of heating elements comprising heating resistors, and electrical conductors for supplying power to the heating elements. Corresponding heating elements are turned on and heated by means of the electrical conductors so as to obtain an appropriate heat pattern in accordance with the data to be recorded, thereby performing printing.

Ceramic substrates are usually obtained by polishing a flat ceramic plate to a given smoothness. A thermal head of this type is called a planar thermal head.

However, such a thermal head requires polishing of a high cost, resulting in an expensive thermal head. In addition, when a printing sheet is inserted or a film-like intermediate medium (such as a thermal head ink ribbon film) is inserted between the printing sheet and the head, a sufficient space is needed therearound, resulting in a large device.

Recently, therefore, an end-face type thermal head has often been used. This thermal head has a driver circuit for driving the heating elements mounted on a face different from that of the heating elements and also has a small head width and projection-like heating elements.

With the conventional end-face type thermal head, however, since the current supplied to a common electrode amounts to a maximum of several amperes, heat tends to be generated.

In addition, since the common electrode is arranged on a side opposite that on which the driver circuit is mounted and is connected to a power supply substrate, the manufacturing steps become complex, resulting in high cost.

SUMMARY OF THE INVENTION

The present invention is contrived in consideration of these circumstances, and is intended to provide an inexpensive thermal head which has a high packing density with a comparatively simple structure, which is not limited by the type of apparatus it will be employed in or the structure thereof, and which causes only small residual charges.

According to an aspect of the present invention, there is provided a thermal head comprising a rod-like member having a surface which is flat in an axial direction of said rod-like member and which curves along a circumferential direction thereof, a heating element array consisting of a plurality of heating elements arranged on said rod-like member along the axial direction thereof, first electrodes connected to said plurality of heating elements of said heating element array and arranged on said rod-like member, second electrodes connected to said plurality of heating elements of said heating element array to oppose said first electrodes and arranged on said rod-like member, and a common pattern for maintaining said first or second electrodes at the same potential and formed on said rod-like member.

DETAILED DESCRIPTION OF THE PREFERRED EMBODIMENTS

The preferred embodiments of the present invention will now be described in detail with reference to FIGS. 1 to 25.

Figure 1:
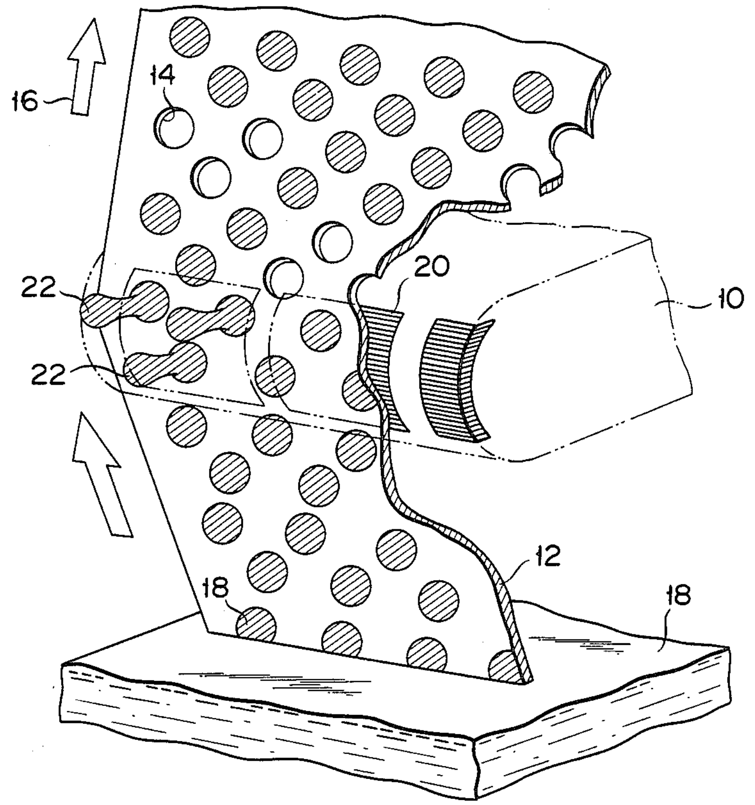
FIG. 1 is a view for explaining the recording principle of a thermal ink-jet printer to which the present invention is applicable.

FIG. 1 is a view for explaining the recording principle of a thermal ink-jet printer. As shown in FIG. 1, thermal head 10 is covered with ink film 12 as a printing medium in the printing state. Ink film 12 is formed of a metal, organic material, or the like (e.g., a nickel sheet as a hydrophilic material), and a large number of holes 14 having a diameter of about 5 to 500 μm are formed therein.

As shown in FIG. 1, when ink film 12 is conveyed in the direction indicated by arrow 16, small holes 14 pass through ink reservoir containing ink 18 and are filled with ink 18. When small holes 14 filled with ink 18 have reached thermal head 10 having heating elements 20, heating elements 20 corresponding to the printing position are selectively supplied with a voltage to be heated quickly. Then, ink droplets 22 are ejected due to pressure from bubbles upon heating of heating elements 20, thus printing an image on sheet.

Figure 2:
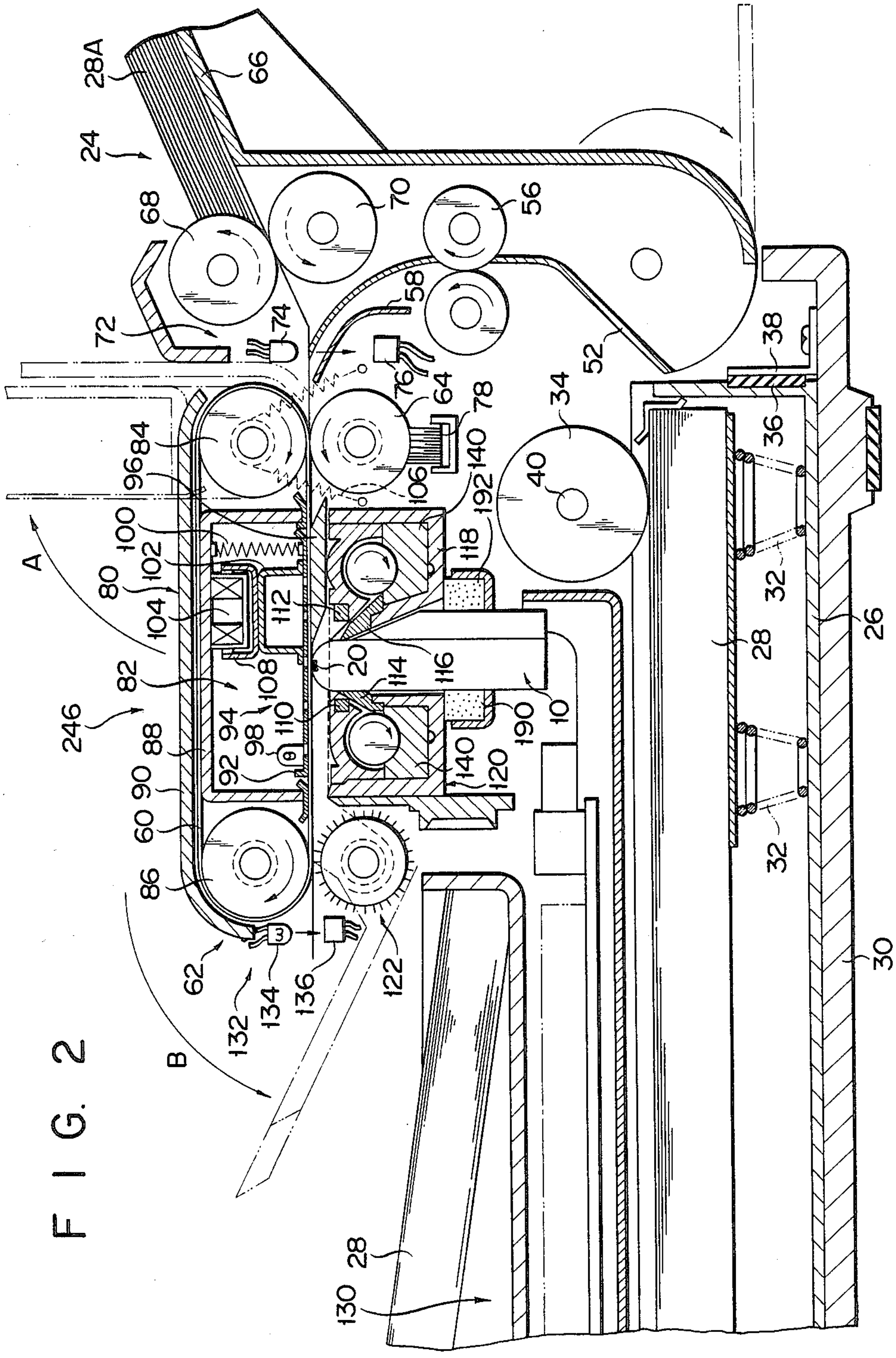
FIG. 2 is a schematic longitudinal sectional view of the thermal ink-jet printer.
Figure 3:
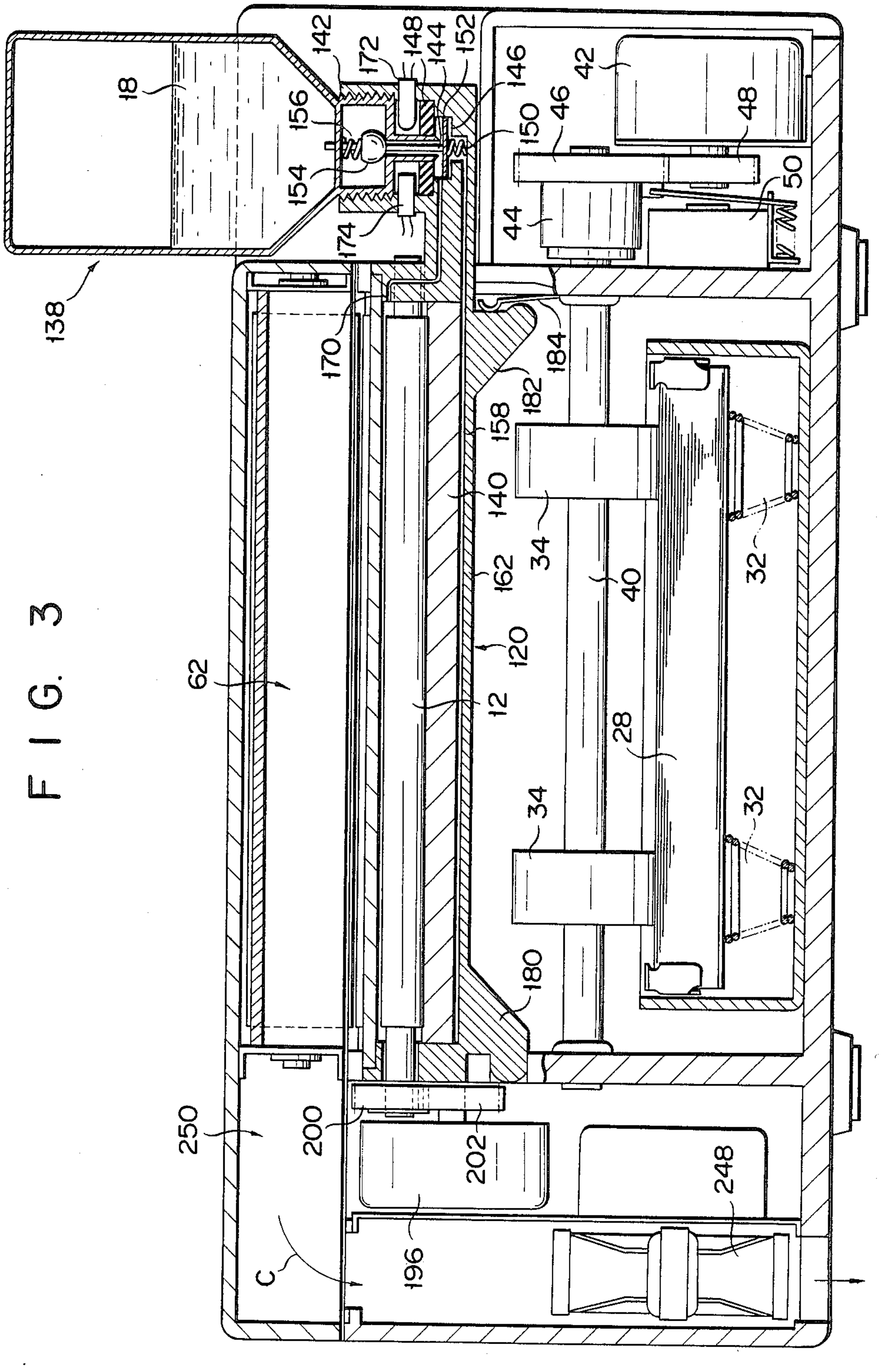
FIG. 3 is a schematic cross-sectional view of the printer shown in FIG. 2.

FIGS. 2 and 3 are schematic longitudinal and cross-sectional views of a printer to which the thermal head of the present invention is applicable. As shown in FIGS. 2 and 3, in printer 24 of this embodiment, paper feed cassette 26 for storing recording sheets 28 to be printed is loaded in the lower portion of housing 30. A lower plate of cassette 26 at the paper pick-up side is pushed upward by the biasing force of push-up springs 32, and uppermost recording sheet 28 is always in contact with first feed rollers 34. When cassette 26 is loaded in housing 30, rubber magnet 36 mounted on cassette 26 magnetically attracts metal plate 38 mounted on housing 30 to be fixed to housing 30.

Shaft 40 axially supports first feed rollers 34 and is coupled to paper feed motor 42 through spring clutch 44 and gears 46 and 48, as shown in FIG. 3. Spring clutch 44 which is engaged/disengaged by solenoid 50. When solenoid 50 is energized in response to a recording signal from image or data processing apparatus (not shown) connected to printer 24, clutch 44 engages shaft 40 with gear 46. Therefore, rotating power from motor 42 is transmitted to shaft 40 through gears 46 and 38 and clutch 44, and uppermost recording sheet 28 contacting rollers 34 is conveyed.

Recording sheet 28 picked up from cassette 26 through rollers 34 is guided upward along first paper feed guide 52, and is then clamped and conveyed by a pair of feed rollers 54 and 56. Rollers 54 and 56 are arranged in a paper feed direction and in rolling contact with each other. Thus, sheet 28 is fed between first and second paper feed guides 52 and 58. Sheet 28 is fed until its front edge abuts against attraction conveyor belt 60 of paper convey unit 62 (to be described later) and register roller 64, which is in rolling contact therewith and is stopped, thus standing by at this position.

That printer 24 is provided with manual paper feed table 66 for manually feeding sheets in addition to cassette 26. When manual recording sheets 28A (e.g., thick sheets) are fed manually on table 66, they are picked up one by one from the lowermost sheet by means of second feed roller 68 and separation roller 70, and are fed until the front edge thereof abuts against belt 60 and roller 64 in the same manner as in the paper feed operation from cassette 26. In this state, sheet 28A stands by.

Roller 64 is coupled to motor 42 (FIG. 3) through clutch (not shown), and is rotated upon engagement of the clutch. Paper detector 7 for detecting the presence/absence of paper is provided between register roller 64 and second feed roller 68. Detector 72 comprises first light-emitting diode (LED) 74 and first photosensor 76 for receiving light emitted from LED 74. When the front edge of sheet 28 shuts off light from LED 74, it abuts against the rolling contact portion of roller 64 and belt 60 a given time after photosensor 76 is turned off. Thus, sheet 28 is appropriately bent.

In this bending of the sheet, the inclination of the front edge of sheet 28 (skew) can be corrected, and the front edge is reliably fed into the rolling contact portion of roller 64. Therefore, sheet 28 can be satisfactorily clamped between roller 64 and belt 60.

Note that dust removing brush 78 for removing paper dust attached to the circumferential surface of roller 64 is in sliding contact with the lower surface of roller 64, thus preventing the recording surface of sheet 28 from being contaminated.

Paper convey unit 62 comprises first and second floating sections 80 and 82. First floating section 80 incorporates first and second rollers 84 and 86, belt 60 looped between rollers 84 and 86, and air suction duct 88 in cover 90. Second floating section 82 comprises belt guide plate 92 and belt urging/separating mechanism 94 for urging belt 60 against or separating it from guide 96 for guiding sheet 28 to thermal head 10.

In mechanism 94, belt guide plate 92 is pivotally supported at its one end by hinge 98 in duct 88, and the other end thereof is biased downward by spring 100, thus urging belt 60 against guide 96. Attraction member 102 is mounted on the back surface of guide plate 92 to face electromagnetic coil 104. When coil 104 is energized, guide plate 92 is shifted against the biasing force of spring 100.

First floating section 80 is biased against roller 64 by spring 106 looped around roller 84 and having two ends fixed to housing 30, and guide plate 92 of second floating section 82 is elastically suspended by spring 100. Therefore, even if supplied sheet 28A is thick, sections 80 and 82 can be shifted accordingly.

High-viscosity fluid shock-absorber 108 is mounted on belt guide plate 92 of second floating section 82 to absorb shock applied to belt guide plate 92.

Paper convey unit 62 is pivotally supported coaxially with the shaft of first roller 84, and can pivot in the direction indicated by arrow A to open a paper convey path. Therefore, if paper jam occurs midway along the convey path, the jammed paper or the cause of the jam can be removed at ease.

When roller 64 begins to rotate, the front edge of sheet 28 is clamped between roller 64 and belt 60 of first floating section 80 at an appropriate pressure by the biasing force of spring 106. Then, sheet 28 is conveyed by the clamping and conveying force of rollers 64 and 84 and the attraction and conveying force of belt 60.

Figure 4:
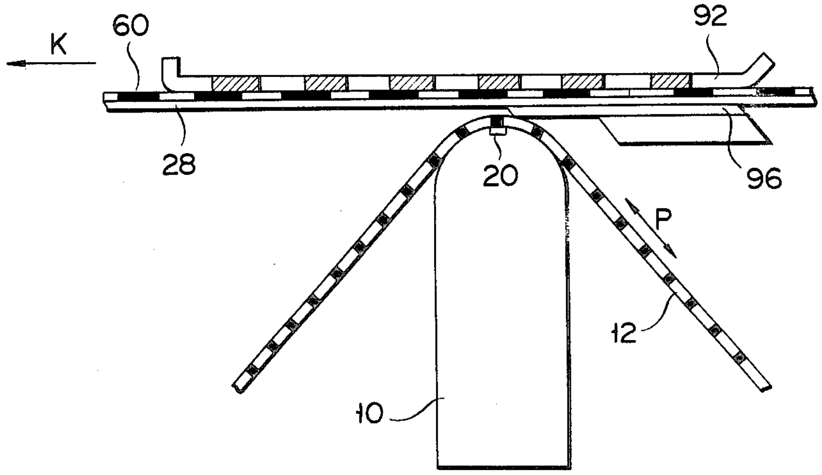
FIG. 4 is a view for explaining the configuration of a main portion of a belt urging/separating mechanism of the printer shown in FIG. 2.

In this case, sheet 28 is urged against guide 96 comprising a 0.2 mm thick flexible film by mechanism 94, and is guided to print unit to be slid along guide 96, as shown in FIG. 4.

Guide 96 described previously is fixed with reference to thermal head 10, so that the surface of guide 96 is separated from heating elements 20 of head 10. In this case, the recording surface (lower surface) of sheet 28 separates by a small gap (e.g., 0.2 mm) from the surface of film 12, which moves to contact heating elements 20 of thermal head 10. Note that the distal edge of guide 96 is about 0.7 mm distant from heating element 20, thereby reliably maintaining a gap between the recording surface of sheet 28 and film 12. According to an experiment, however, since the head portion in the vicinity of element 20 is flat, a constant gap can be maintained between sheet 28 and film 12 within a range of 3 mm from the tip of head 10.

In fact, according to an experiment for testing the performance of the embodiment, the gap between the surfaces of film 12 and sheet 28 is kept within the range of about 0.1 to 0.3 mm when a resolution of 8 lines/mm is to be maintained.

As a result, guide 96 can be a flexible thin plate having a thickness of 0.1 to 0.3 mm.

Since the gap between the recording surface of recording sheet 28 and film 12 is small, ink 18 on film 12 undesirably tends to contact the recording surface of sheet 28. According to the experiment for testing the performance of the embodiment, however, the surface of guide 96 is hydrophobic and the edge opposing elements 20 is a knife-like edge. Therefore, it was confirmed that ink 18 is prevented from drawing by film 12 to a portion under guide 96 along the moving direction of film 12, thereby contaminating the recording surface.

In this embodiment, film 12 is obtained by photoetching a polyimide film with a thickness of 12.5 μm to have a large number of holes 14, each with a diameter of 25 to 20 μm, and coating Teflon (available from Du Pont de Nemours) on its surface opposing sheet 28, thereby performing a hydrophobic treatment. As a result, the exudation of ink toward sheet 12 from film 12 is greatly decreased. In addition, excessive ink removing members 110 and 112 to be described later are made of a hydrophilic elastic material. Therefore, ink 18 can be completely cleaned off the surface of members 110 and 112 even if it is attached thereto. With this configuration, overflow of ink 18 from the edge of guide 96 can be prevented more effectively.

A wear-resistance treatment using a siloxane derivative with a thickness of about 3 μm is performed on the surface of film 12 opposing head 10 and on the surface of head 10. Therefore, even if film 12 touches head 10 during printing, no wearing or scratches will be caused on film 12 and head 10. The siloxane derivative can be manufactured by, e.g., allowing quadrifunctional silicon tetrachloride to react with water in a predetermined amount of a monohydric alcohol or an ester, thereby providing a colloid disperse system of partial hydrolyzate. The resultant liquid is coated on one surface of film 12, and is left to stand at 50° to 100° C. for several hours to form a wear-resistant film of the siloxane derivative. It is apparent from the experiment that the wear-resistant film is not damaged even by rubbing with steel wool.

The siloxane treatment provides a glass-like silica thin film which is resistant to heat. The siloxane matrix seems to have silanol groups so that it has a moisture-absorptive characteristics and a hydrophilic nature. Therefore, recording ink 18 is uniformly attached thereto. In addition, since ink 18 can be readily supplied to heating elements 20 through the contact surface with thermal head 10 due to capillary action, insufficient supply of ink 18 is completely prevented.

As will be described later, even when film cartridge 120, consisting of at least film 12, excessive ink removing members 114, 116, 110, and 112, and container 118, is installed and removed from printer 24, an operator's hands are not soiled since the surface of film 12 is clean. In addition, since sheet 28 is lightly abutted against film 12, which is in tight contact with heating elements 20 through guide 96, the gap between sheet 28 and elements 20 is determined by the thicknesses of guide 96 and film 12. The gap mentioned above is thus kept constant.

Figure 5:
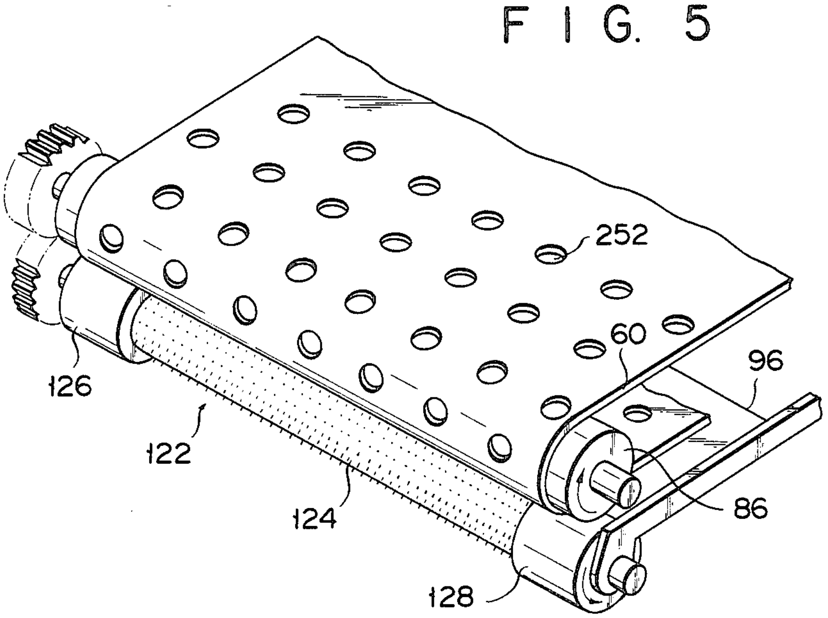
FIG. 5 is a partial perspective view of a paper discharging unit.

After printing, when the front edge of sheet 28 further moves forward, it is clamped between second roller 86 of first floating section 80 and paper discharge roller 122. In this case, as shown in FIG. 5, the recording surface of sheet 28 is supported by needle-shaped portion 124 having needles projecting from the circumferential surface of roller 122. Reference roller portions 126 and 128 are provided at two end portions of roller 122 and are in rolling contact with belt 60. Therefore, sheet 28 can be conveyed without receiving an excessive pressure, thus protecting an undried image from being deteriorated. More specifically, since the ink ejected on sheet 28 is not rubbed by roller's surface, a clear image can be obtained.

Sheet 28 further moves forward and the rear edge thereof passes through the rolling contact portion between register roller 64 and first roller 84.

In this case, a force for urging sheet 28 against guide 96 is transmitted through mechanism 94, and belt guide plate 92 of second floating section 82 is pushed upward relative to the housing of first floating section 80 by a reaction force to plate 92 from guide 96 against the biasing force of spring 100 through shock-absorber 108.

After the rear edge of sheet 28 has passed between rollers 64 and 84, roller 64 and belt 60, which are temporarily separated, are again brought in rolling contact with each other by their weights. Therefore, the pressure applied on sheet 28 is reduced to the total weight of plate 92 and the biasing force of spring 100, and sheet 28 can be smoothly conveyed.

When sheet 28 moves further forward and the rear edge thereof has passed by the edge portion of guide 96 at the side of thermal head 10, guide plate 92 has already been pushed upward through shock-absorber 108, and can be moved downward slowly by the shock-absorbing effect of shock-absorber 108. Therefore, the rear edge of sheet 28 can pass by heating elements 20 of thermal head 10 while the sheet 28 is approaching the surface of film 12.

If belt guide plate 92 does not receive any reaction force and is moved downward by its total weight and the biasing force of spring 100, immediately after the rear edge of sheet 28 passes through the edge portion of guide 96, the surface of film 12 is brought into contact with the recording surface of sheet 28, thus contaminating the rear edge of sheet 28 with ink.

In this embodiment, when the front or rear edge of sheet 28 falls within the range of about 6 mm from heating elements 20 forward and backward along the paper convey direction, electromagnetic coil 104 is energized to attract guide plate 92 upward. Then, sheet 28 separates from the surface of film 12, thus preventing the front or rear edge of sheet 28 from contacting the surface of film 12 when the front or rear edge of sheet 28 is folded or bent.

In this way, film 12 will not contact and contaminate sheet 28. In addition, sheet 28 passes by roller 122 while maintaining a small gap between belt 60 and film 12, and is discharged onto paper discharge tray 130 without being contaminated.

Detector 132 for detecting if sheet 28 has been discharged is provided between rollers 122 and 86 at the side of tray 130. Detector 132 comprises second LED 134 and second photosensor 136 facing the paper convey path. When sheet 28 is discharged to tray 130 and the rear edge thereof passes by LED 134, a rising signal of photosensor 136 is detected to detect that sheet 28 is discharged.

Ink supply from ink tank 138 to film cartridge 120 and from ink reservoir 140 of cartridge 120 to ink film 12 will be described with reference to FIGS. 2 and 3.

As shown in FIG. 3, film cartridge 120 and ink tank 138 are detachably mounted. Ink 18 is stored in tank 138, which is screwed in and fixed to ink-tank mounting portion 142 of cartridge 120. Transparent ink supply tube 144 of tank 38 pushes valve 146 of cartridge 120 in tight contact with seal 148 for mounting portion 142 against the biasing force of spring 150.

Figure 6:
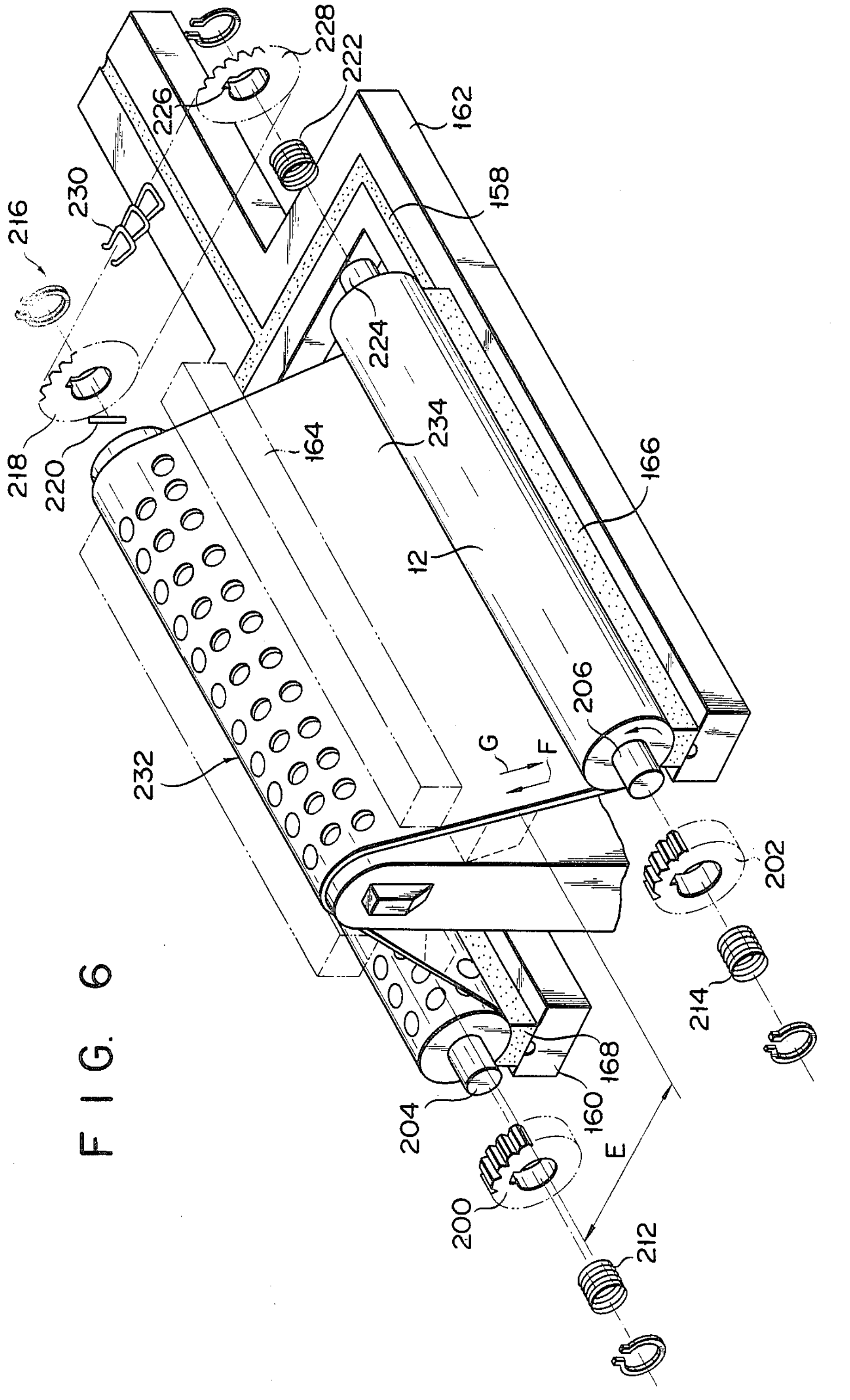
FIG. 6 is a perspective view of a print unit.

Valve 146 of cartridge 120 pushes ink-tank open/-close rod 152 upward and, therefore, pushes valve 154 of tank 138 against the biasing force of valve spring 156, thus supplying ink 18 in tank 138. Ink 18 is supplied from tank 138 until the obliquely cut distal end portion of tube 144 is filled with ink. Ink 18 is caused to flow into narrow ink supply paths 158 and 160 formed in container portion 162 of cartridge 120 through small holes formed in the surrounding portion of valve 146 of cartridge 120 and guide path 164, as shown in FIG. 6.

Ink 18 soaks into felt ink supply members 166 and 168, and is coated on film 12 therethrough. Therefore, as shown in FIG. 1, small holes 14 of film 12 are filled with ink 18, and ink droplets 22 are formed by bubbles upon quick heating of heating elements 20.

In mounting portion 142, when ink 18 is consumed and the level of ink 18 drops below the obliquely cut distal end of tube 144, air is taken from air suction path 170 formed in ink reservoir 140 of cartridge 120 into ink tank 138, thus supplying new ink 18.

Air suction path 170 is formed in the upper section of mounting portion 142, so that its volume is set as small as possible, as can be seen from FIGS. 2 and 3. As will be described later, air communication with respect to ink reservoir 140 is allowed only when small holes 14 of film 12 pass by first and second excessive ink removing members 114, 112, 116, and 110 of elastic rubber, which also act as seal members. Thus, ink 18 can be refilled from tank 138 to ink reservoir 140 when film 12 is moved, but this operation is not allowed when cartridge 120 is exchanged or moved.

Thus, ink 18 will not be excessively supplied to cartridge 120 and leaks are prevented.

As shown in FIGS. 2 and 3, since ink 18 is supplied to film 12 through felt ink supply members 166 and 168, it will not form a free surface as liquid in ink reservoir 140. Therefore, since ink 18 is trapped in felt fibers by its surface tension, it cannot leak outside cartridge 120.

The operation when tank 138 is demounted from mounting portion 142 of cartridge 120 will be described below.

When ink 18 in tank 138 is used up upon refilling thereof, the level of ink 18 drops further and reaches tube 144. In this case, light emitted from ink detection LED 172 is transmitted through tube 144 to turn on opposing ink detection photosensor 174, thus producing a detection signal. Thereby, a no-ink state of ink tank 138 can be detected.

Then, printer 24 displays the no-ink state on a display portion thereof or on a display portion of data processing apparatus (not shown) connected thereto. When ink 18 is not supplied to head 10, the no-ink state of tank 138, i.e., a need for replacement of it, is signaled.

Ink tank 138 is thus replaced. In this embodiment, a demounting procedure and the operation of valve 154 of tank 138 and valve 146 of cartridge 120 are performed in a manner opposite that described previously.

More specifically, valve 146 of cartridge 120 moves upward and is brought in tight contact with the lower surface of seal 148 by the biasing force of spring 150, thereby preventing ink 18 in cartridge 120 from being leaked therefrom.

Note that in this embodiment, tank 138 has a volume of about 100 cc, and except for tube 144 is formed of a non-transparent material in consideration of weather resistance. About 2,000 to 5,000 A4-size sheets can be printed at a normal recording density using about 100 cc of ink. Film cartridge 120 is preferably replaced after 100,000 A4-size sheets are printed or after 3 years have passed because of clogging of small holes 14 of film 12 due to paper dust, mold, dried ink, and the like. For this purpose, cartridge 120 and tank 138 are separately arranged. In addition, with the above structure, leakage or evaporation of ink 18 from tank 138 can be prevented.

Mounting of film catridge 120 on printer 24 will be described.

Figure 7:
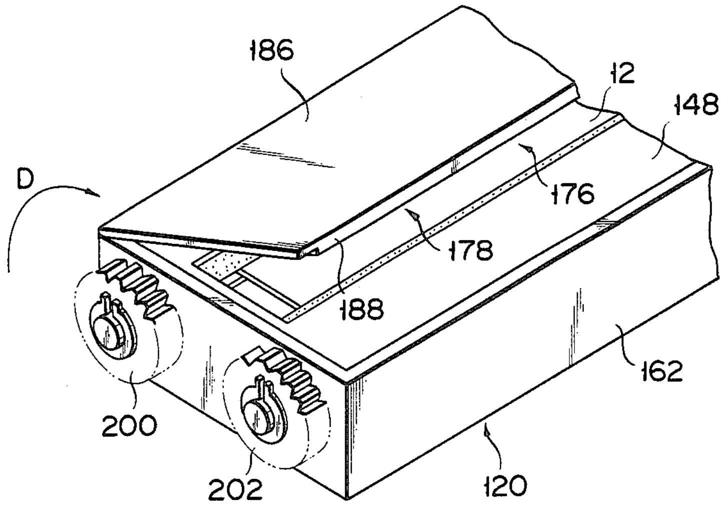
FIG. 7 is a partial perspective view of a film cartridge.
Figure 8:
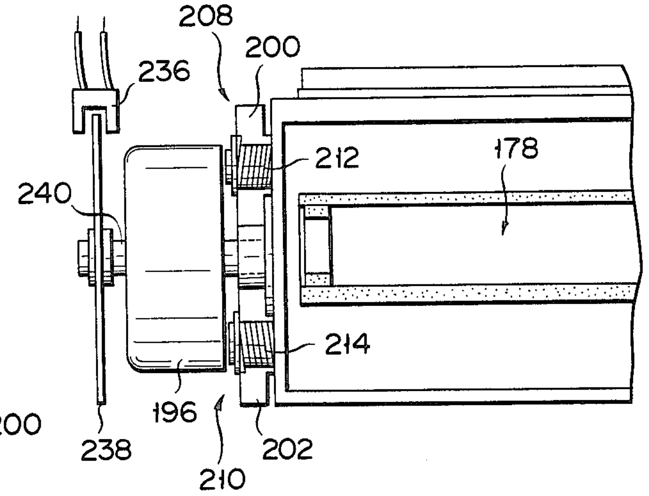
FIG. 8 is a plan view showing a main portion of a film convey unit of the printer shown in FIG. 2.

In printer 24, thermal head 10 is fixed to housing 30, and window 176 is formed in container 162 positioned at film exposing portion 78 of cartridge 120, as shown in FIGS. 7 and 8. Therefore, thermal head 10 can be inserted therethrough to be set on housing 30.

As shown in FIG. 3, first supporting portion 180 of cartridge 120 is inserted in housing 30, and second supporting portion 182 thereof provided at its other end is pushed downward. In this case, cartridge fixing spring 184 is moved to the right in FIG. 3, and the recess portion of second supporting portion 182 is engaged with the head portion of spring 184, thereby fixing cartridge 120.

With the above arrangement of this embodiment, container 162 of cartridge 120 has a window, thus providing sufficient mechanical strength to cartridge 120.

As described above, cartridge 120 can be easily mounted or demounted, even if ink tank 138 is mounted thereon. The color of ink 18 can be changed simply by replacing cartridge 120. When cartridge 120 is mounted or demounted, guide plate 92 pivots upward as indicated by arrow A in FIG. 2, and guide 96 pivots as indicated by arrow B, to widely open the upper portion of cartridge 120, thus allowing easy removal of jammed paper in paper convey unit 62 and paper dust attached to film 12, and facilitating replacement of cartridge 120.

When cartridge 120 is demounted, in order to prevent leakage or evaporation of remaining ink 18 in cartridge 120, cartridge cover 186 is pivotally hinged on film exposing portion 178 of cartridge 120, as shown in FIG. 7, and pivots to cover film exposing portion 178, as indicated by arrow D. Projection 188 of cover 186 is in tight contact with first and second excessive ink removing members 114, 112, 116, and 110, thus providing a seal to cartridge 120.

As shown in FIG. 2, in this embodiment, a pair of ink absorbing members 190 and 192 are arranged to be in contact with the lower portion of thermal head 10, thereby absorbing ink 18 flowing along the wall of thermal head 10. Therefore, ink leakage from head 10 can also be prevented.

The drive operation of ink film 12 will now be described.

Figure 9:
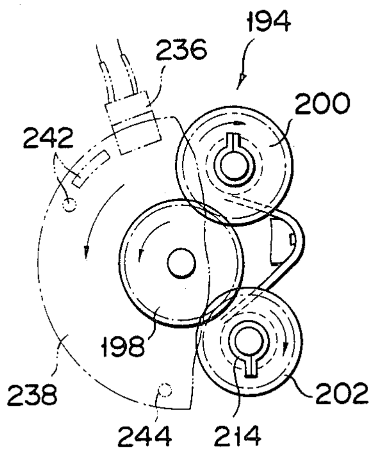
FIG. 9 is a side view of the film convey unit shown in FIG. 8.

FIG. 8 is a plan view of film drive mechanism 194 as a printing medium drive mechanism, and FIG. 9 is a side view thereof. Film drive mechanism 194 comprises film drive motor 196 and gear 198 mounted on the shaft of motor 196. Gear 198 is meshed with gears 200 and 202 of a pair of rolls 204 and 206 around which film 12 is wound. One-way clutch 208 is interposed between roll 204 and gear 200, and one-way clutch 210 is similarly interposed between roll 206 and gear 202. Note that motor 196 can be rotated in the reverse direction, and ink film 12 can be moved upward or downward in FIG. 9.

As shown in FIG. 6, since one end of left-hand wind spring 212 fitted in film roll 204 is engaged with the recess portion of gear 200, when gear 200 is rotated clockwise, spring 212 is more tightly wound around roll 204, thus transmitting power from gear 200 to roll 204.

In this case, gear 202 causes right-hand wind spring 214 fitted in roll 206 to be loosened from roll 206. In this embodiment, however, since roll 206 and spring 214 are rotated in the same direction, they slip.

When film cartridge 120 is mounted or demounted, since gears 200 and 202 are separately meshed with motor gear 198, film 12 may be kept slack or an excessive tension may be continuously applied thereto. In the latter case, film roll 206 and spring 214 can slip to alleviate excessive tension.

As shown in FIG. 6, cartridge 120 is provided with film tension mechanism 216 for applying a given tension to film 12 at the side opposite rolls 204 and 206. Film tension mechanism 216 removes slack in film 12, and causes film 12 to be pressed against heating elements 20 of thermal head 10 at an appropriate pressure. Ladder wheel 218 is fixed to one end of roll 204 by pin 220, and left-hand wind torsion spring 222 is fitted in one end portion 224 of roll 206. The other end of torsion spring 222 is engaged with notch portion 226 of ladder wheel 228, which is coupled to wheel 218 through ladder chain 230.

Referring to FIG. 6, torsion spring 222 is twisted so that roll 206 is biased thereby counterclockwise and roll 204 is biased thereby clockwise when ladder chain 230 is looped between ladder wheels 218 and 228. Therefore, an appropriate tension can be applied to film 12 in accordance with a torsion force (i.e., torque) from torsion spring 222. As a result, when film 12 is mounted on printer 24, it can be slidably moved to be in tight contact with the distal end portion of head 10 at an appropriate pressure without being slackened.

A case will be described wherein gear 198 is rotated counterclockwise in FIG. 9.

In this case, gear 202 is rotated counterclockwise, and spring 214 is operated to be tightly wound around roll 206. Then, film 12 is moved in a direction to be taken up by roll 206. In this way, upon clockwise or counterclockwise rotation of motor 196, film 12 is reciprocated. In this embodiment, slackening of film 12 can be prevented upon operation of springs 214 and 212 and mechanism 216 when cartridge 120 is mounted or demounted, and film 12 or thermal head 10 will not be damaged due to excessive tension.

Figure 10:
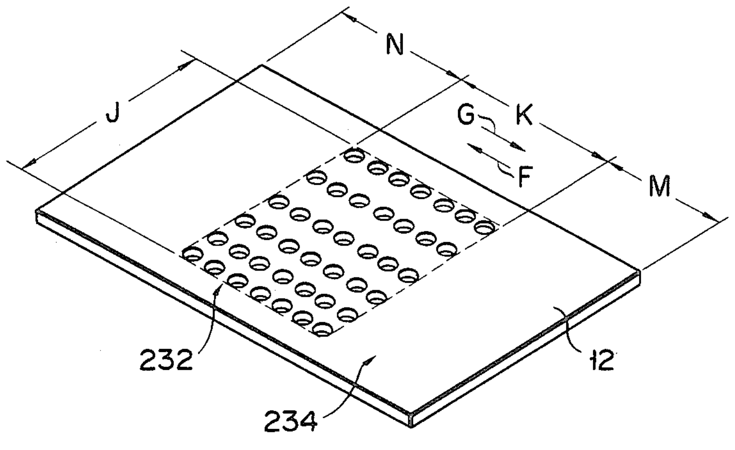
FIG. 10 is a partial perspective view of an ink film.

As shown in FIG. 10, region 232 having a large number of holes 14 and regions 234, which have no holes and are formed at two sides thereof, are formed on film 12. When the printing operation is performed, region 232 must face heating elements 20. When the printing operation begins, the front end portion of region 232 in the film moving direction reaches heating elements 20. Therefore, film position detection mechanism 236 for detecting the front and rear end portions of region 232 of film 12 is provided in film drive mechanism 194.

As shown in FIGS. 8 and 9, in detection mechanism 236, detection wheel 238 for detecting a film position is mounted on drive shaft 240 of motor 196. In wheel 238, first and second slits 242 and 244 are formed at positions corresponding to two boundary portions of region 232 of film 12, i.e., the front and rear end portions in the film moving direction. First slit 242 consists of an elongated hole and a round hole, and second slit 244 consists only of a round hole. Position detector 236 for detecting the positions of slits 242 and 244 with light is arranged to sandwich the edge portion of wheel 238.

When motor 196 is rotated, position detector 236 senses short and long light pulses formed by holes of slit 242, and compares them with a constant clock pulse incorporated in electric control circuit (not shown). As a result, detector 236 detects at the rear end of the elongated hole along the clockwise direction that the detected slit is first slit 242. When detector 236 senses a single light pulse transmitted through slit 244, it can detect that the detected slit is second slit 244. Motor 198 receives a stop signal from the control circuit when detector 236 detects first slit 242.

When motor 196 is stopped, region 234 of film 12 (FIG. 10) covers film exposing portion 178 of cartridge 120, and region 232 is stored in ink reservoir 140 below ink removing members 112 and 116 provided to cartridge 120. Since cartridge 120 is covered with region 234, it can be sealed from the outer atmosphere.

In this way, evaporation of ink 18 in cartridge 120, which causes an increase in viscosity of ink 18, can be prevented. If the viscosity of ink 18 is increased, the ejection speed of ink droplets from holes 14 is decreased or, in the worst case, prevent ejection therefrom.

Print unit 246 receives a printing command from data processing apparatus 38 (not shown), connected to printer 24, for processing image or character data, and drives first feed rollers 34 to supply recording sheet 28 to paper convey unit 62. When motor 196 is rotated counterclockwise in the direction indicated by arrow D in FIG. 9 by a predetermined number of pulses, film 12 is moved for a predetermined period of time. The front end portion of region 232 of film 12 in the film moving direction is thus positioned at heating elements 20, and awaits arrival of recording sheet 28 to coincide with the front edge of sheet 28. Thereafter, film 12 is moved in synchronism with movement of sheet 28. The moving speed of film 12 (20 mm/sec) is half that of sheet 28 (40 mm/sec).

Figure 11:
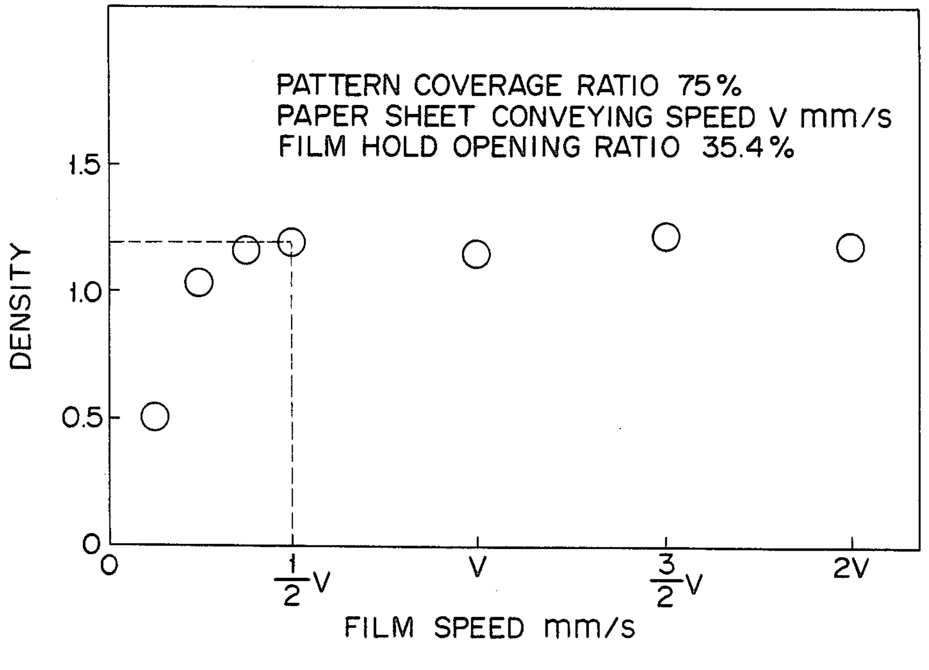
FIG. 11 is a graph showing the relationship between a film speed and a recording density.

As shown in FIG. 11, when the moving speed of sheet 28 is varied within the range of 10 to 100 mm/sec, if the moving speed of film 12 is V/4 or higher with respect to moving speed V of sheet 28, the recording density of sheet 28 can be 1.0 or more (black solid, hole opening ratio 34.5%, coverage ratio of the printing portion to the sheet 75%) regardless of a moving direction of sheet 28 relative to film 12. Note that the hole opening ratio is the ratio of hole area to film area.

Therefore, a moving distance of film 12 can be made shorter than the recording length (recording direction) of sheet 28, the area of region 232 can be reduced, and film 12 can be manufactured with ease. If region 232 has a large area, it is difficult to form uniform-diameter holes (25 to 30 μm) over the entire area of region 232. Therefore, the diameter of holes 14 is reduced at, e.g., surrounding portions, resulting in irregular recording density. However, in this embodiment, the area of region 232 can be reduced, thus obtaining a regular, uniform shape.

When film 12 is subsequently moved, the rear end of region 232 reaches heating elements 20 from the side of removing members 112 and 116. Film position detector 236 then detects second slit 244. In this case, in order to satisfy the above relationship between the respective positions of film 12 and first and second slits 242 and 244 of wheel 238, film 12 must be wound at the side of members 112 and 116 upon setting of cartridge 120. In addition, motor 196 must be stopped upon detection of the round hole of first slit 242 by detector 236.

When sheets 28 are continuously supplied and nth sheet 28 (n is an even integer) is subjected to recording, film 12 is wound until the rear end of region 232 at the side of members 112 and 116 reaches roll 204, to be filled with ink 18. Thereafter, film 12 is moved in a direction opposite to the film moving direction as described above. Arrival of the rear end of region 232 is awaited for a predetermined period of time to align the front end of sheet 28 with the rear end of region 232, and film 12 and sheet 28 are then fed in synchronism with each other for recording.

When (n+1)th sheet 28 is to be recorded, the other end of region 232 at the side of members 114 and 110 is wound around roll 206 to be filled with ink 18, and is then returned to heating elements 20. After the corresponding end of region 232 is aligned with the front edge of sheet 29, film 12 is moved.

Since the recording operation is performed by the reciprocal movement of film 12, continuous recording is enabled.

First and second excessive ink removing members 114, 116, 110, and 112 are alternately arranged to be in contact with film 12, and second members 116 and 110 are arranged above first members 114 and 112.

Since film rolls 206 and 204 are arranged below the top of thermal head 10, print unit 246 can be rendered compact, and sheet 28 can be conveyed while strictly maintaining a gap between sheet 28 and heating elements 20. In addition, when rolls 204 and 206 are arranged below first members 114 and 112 arranged at the side of thermal head 10, the distance between second members 116 and 110 can be reduced, and the area of film exposing portion 178 can also be reduced. Therefore, compact film cartridge 120 can be provided.

A case will be described wherein film 12 is moved in the direction indicated by arrow G in FIG. 6. Film 12 filled with ink 18 through ink reservoir 140 is moved upward, and excessive ink is removed from film 12 by first excessive ink removing member 114. However, during the recording operation, since region 232 passes by member 114, excessive ink 18 is moved by a constant amount to the side opposite thermal head 10 through region 232.

Ink 18 moved to the opposite side is removed by second excessive ink removing member 116, and is then transferred to the side of thermal head 10. When film 12 is moved in the direction indicated by arrow G and region 232 passes by members 114 and 116, the sufficient amount of ink 18 can be coated not only on holes 14 but on the entire surface of film 12.

Therefore, this reduces film moving speed to ¼ that of sheet 28.

A case will be described when region 232 is moved downward along members 114 and 116. First, ink on the recording surface side of film 12 is removed by member 112. Therefore, dust or paper powder attached to film 12 is removed as well as excessive ink 18 attached thereto. In this case, ink 18 left on the distal end portion of member 116 is moved to the side of thermal head 10 through holes 14 of region 232, and is again removed by member 114, thus being left on the distal end portion of member 114.

Ink 18 removed and left on the distal end portion of member 114 is then moved to the side opposite to thermal head 10 through holes 14 of region 232. In this way, excessive ink 18 is recovered in ink reservoir 140 of cartridge 120.

When region 234 of film 12 passes by members 114 and 116 in a direction indicated by arrow F in FIG. 6 (i.e., downward), the surface of film 12 opposite to thermal head 10 is already cleaned by member 110, and need not be cleaned by member 116. However, paper powder and rubber dust are deposited on the distal end portion of member 116.

The surface of film 12 at the side of head 10 is also cleaned by member 112, and need not be cleaned by member 114.

When region 234 of film 12 covers film exposing portion 178 of cartridge 120, the exposed portion of film 12 is cleaned, and the operator need not soil his hands with ink.

As shown in FIG. 10, since lengths M and N of regions 234 of film 12 are set to be longer than film exposing width E (FIG. 6) of cartridge 120, air communication through a gap between first and second excessive ink removing members 114, 112, 116, and 110 can be prevented. Thus, ink 18 can be protected from evaporation, and the viscosity thereof will not be changed, thus providing a clear image.

An operation for removing paper dust attached to film 12 will be described.

When film 12 is moved in the direction indicated by arrow G (FIG. 6), paper powder and dust attached to the distal end portion of member 110 are also moved together with film 12 and then reach heating elements 20 of head 10. Film 12 is clamped between heating elements 20, and is slightly reciprocated several times. At the same time, suction fan 248 (FIG. 3) is energized to attract paper particles or dust on film 12 and draws them into air-suction guide 258 through suction hole 252 (FIG. 5) of belt 60.

As a result, paper powder or dust attached to film 12 can be removed, thus preventing clogging of holes 14 of region 232 of film 12.

In this embodiment, since the paper-powder is removed when about thirty seconds of time has passed after a series of successive recording operations, the print operation will not be adversely influenced.

When region 234 of film 12 is exposed from cartridge 120, the paper-powder removing procedure is executed. Therefore, ink 18 will not be drawn into guide 250 not become attached to belt 60.

The operation of film 12 after a series of recording operations by print unit 246 will be described.

After the series of recording operations is completed, film 12 is moved at a lower speed than in a recording mode for a predetermined period of time (several seconds). This prevents ink 18 from being dried by heat from heating elements 20 of head 110 before the recording operation is completed. Next, the paper-powder removing procedure is carried out for about 10 seconds, and film exposing portion 178 of cartridge 120 is then covered with region 234 of film 12.

First excessive ink removing members 114 and 112 are formed of an elastic member, and the edges thereof at the side of thermal head 10 are in tight contact with thermal head 10 at the lower surface of film 12. As a result, ink 18 flowing down along the wall of head 10 can be recovered in ink reservoir 140 of cartridge 120 through holes 14 of region 232 of film 12. Since members 114, 116, 110, and 112 are formed of a material that is impermeable to air, communication between ink 18 inside cartridge 120 and air outside cartridge 120 can be prevented.

The relationship between the diameter of holes 14 of film 12 and the pitch therebetween will be explained with reference to FIG. 12.

Figure 12:
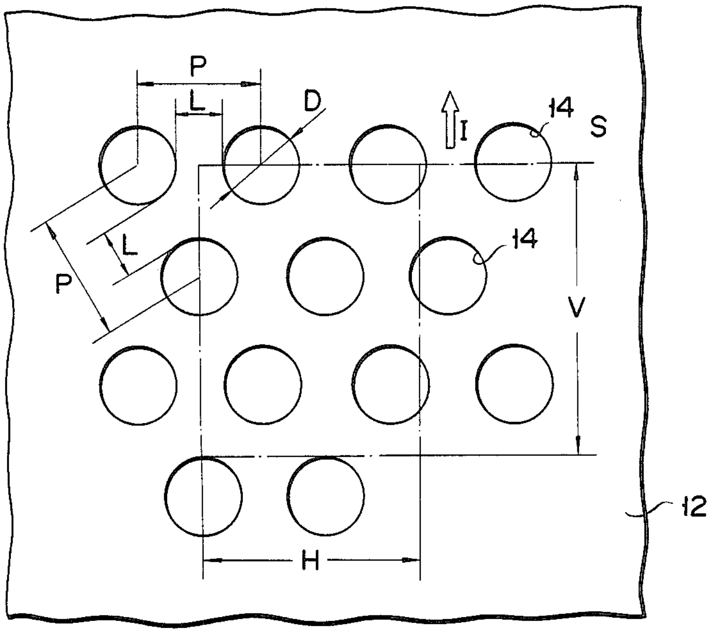
FIG. 12 is a partial plan view of the ink film.

Referring to FIG. 12, arrow I indicates the moving direction of film 12, and three adjacent holes 14 are arranged to form a regular triangle. In FIG. 12, reference symbols H and V indicate dimensions of heating elements 20, which are respectively 100 μm to 125 μm. Reference symbol D denotes a diameter of hole 14, which is 25 μm; P, a pitch between the centers of adjacent holes 14, which is 45 μm; and L, a minimum distance between adjacent holes 14, which is 20 μm. From the tests, it was found that when a maximum distance between adjacent holes 14 was given by P, relations $H \geqq 2P$ and $V \geqq 2P+D$ were satisfied. In addition, in the case of a resolution of 8 lines/mm, when diameter D of hole 14 fell within the range of D=15 to 35 μm and P fell within the range of P=40 to 50 μm, good printing quality could be obtained.

Figure 13:
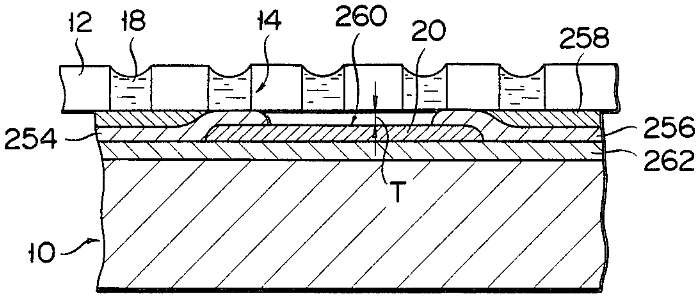
FIG. 13 is a partial sectional view for explaining an arrangement of an energizing element portion of a thermal head with regard to the ink film.

FIG. 13 shows a cross section of heating elements 20.

Heating elements 20 and electrical conductors 254 and 256 are covered with wear-resistant thin insulating film 258 of aluminum oxide ($Al_2O_3$). When a voltage is applied to heating elements 20 to quickly heat them, bubbles are formed from elements 20. Ink 18 filled in holes 14 is immediately ejected due to the pressure of the bubbles, thus achieving the printing operation. In this embodiment, resistance is set at 300 Ω, and the 24-V voltage of pulse width of 10 μ/sec is applied to elements 20 to eject ink. 2,100 erg per heating element is consumed.

When thickness T of gap 260 between heating elements 20 and film 12 exceeds 3 μm, ink ejection power is substantially uniform, and good printing quality can be obtained. However, if thickness T exceeds 10 μm, ejection power is reduced and printing quality is degraded. When thickness T is below 3 μm, energy consumption per heating element 20 exceeds 2,100 erg, and the smaller thickness T, the more energy is required. In this embodiment, thickness T is set to be 3 μm. Note that in FIG. 13, reference numeral 262 denotes a glazed glass layer. As a material for heating element 20, a metallic oxide thin film, which contains ruthenium oxide as a major component and 0.6 to 2.0% (atomic ratio: M/Ru [ruthenium]) of M (M is at least one element selected from the group consisting of Ca [calcium], Sr [strontium], Ba [barium], Pb [lead], Bi [bismuth], and Tl [thallium]) is used.

When the metallic oxide thin film is used, a change in resistance due to oxidation can be prevented. Therefore, high electric power can be applied to heating elements 20 to heat them to high temperatures regardless of the change in resistance, and stability over longterm use can be assured. Since the metallic oxide thin film used for heating elements 20 has a relatively high resistance, only a small current is required to obtain high heating density. For this reason, current flowing through a conductive layer connected to a heating resistor is reduced, and heat generation from this portion can be suppressed. Therefore, so-called image blurring during the printing operation can be prevented. In addition, since the thin film has a positive resistance-temperature coefficient, large current can be initially applied thereto to achieve high-speed printing.

A configuration of thermal head 10 according to another embodiment of the present invention will be described with reference to FIGS. 14 to 19.

A thermal head usually employs a ceramic substrate. When a pattern for heating elements 20 and wirings of a driver integrated circuit (IC) are formed on the surface of the ceramic substrate, disconnection of the pattern and the like may occur since the surface of the ceramic substrate is rough. As a result, a precise pattern cannot be obtained, resulting in a low dot density. In order to eliminate this drawback, the ceramic substrate must be polished, and a glass-glazed layer must be provided, resulting in high cost.

In order to solve this problem in thermal head 10 according to the present invention, heating elements 20, and driving power source side and drive signal side electrodes (electrical conductors) 254 and 256 are formed on round glass rod 266 as a rod-like member. Rod 266 is adhered to the end face of support member 268. Therefore, in thermal head 10 of the present invention, elements 20 are formed on rod 266 so that formation of a particular glass-glazed layer or polishing are not needed. In addition, the cost of the material is inexpensive.

As support member 268 for supporting rod 266, an aluminum plate 270 which has a good heat conductivity, for example, is used. Glass epoxy substrate 274 as a circuit board for mounting driver ICs 272 thereon is mounted on plate 270. Accordingly, substrate 274 costs less than 1/5 that of a conventional substrate. However, in order to connect driver ICs 272 on support member 268 and electrodes 264 on rod 266, a precise pattern must be formed on substrate 274. It is, however, difficult to provide such a precise pattern on substrate 274 with conventional etching techniques. Therefore, the aluminum substrate must be polished to provide a precise pattern,, which inevitably results in an increase in cost.

Figure 14:
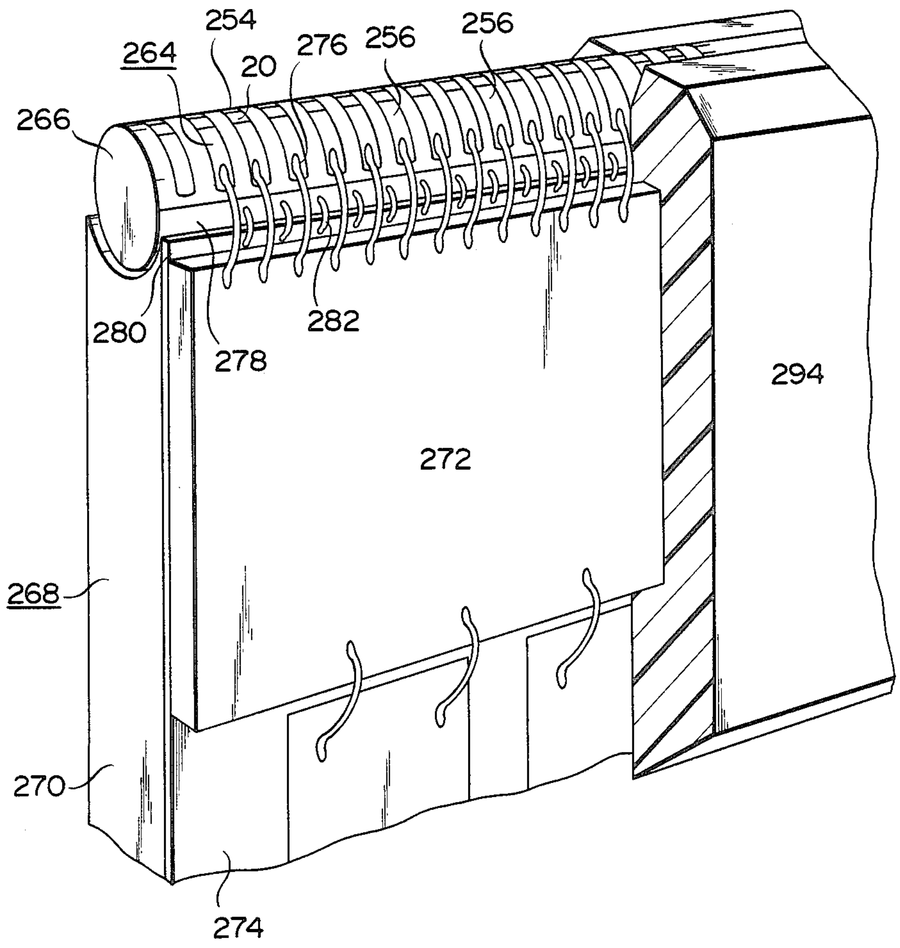
FIG. 14 is a partially sectional perspective view for schematically showing a thermal head according to an embodiment of the present invention.

For this purpose, in thermal head 10 of the present invention, driver ICs 272 are adhered on a portion of glass epoxy resin substrate 274 which is close to round glass rod 266. The output terminals of driver ICs 272 are connected to drive signal side electrodes 256 on rod 266 by bonding through connection wires (gold wires) 276 as conductive wires. With this arrangement, no precise pattern as described above need be formed on substrate 274, thereby achieving an inexpensive mounting method. In addition, the number of input terminals of driver ICs 272 is about 1/5 that of its output terminals, as shown in FIG. 14. Therefore, even if a wiring pattern is formed on substrate 274, the pattern density is not increased very much. As a result, short-circuiting or disconnection of the pattern will not occur.

It is estimated from calculating energy consumption distribution that most of the energy (90% or more) consumed by the pulse heating of heating elements 20 is not used by ink-jet of printing ink 18, but is accumulated in film 12 and the like. The accumulated heat may heat film 12 and ink 18 to near the boiling point of the ink 18. As a result, ink-jet conditions are different in cases with and without heat accumulation. In other words, the thermal hysteresis of the printing causes non-uniformity in the density of the printed image. This problem cannot be solved by simply adjusting the current of heating elements 20.

Figure 15:
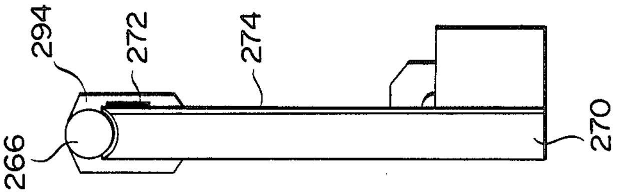
FIG. 15 is a schematic side view of the thermal head shown in FIG. 14.

In order to reduce this heat accumulation, thermal head 10 of the present invention uses aluminum plate 270, which has a good heat conductivity, as support member 268 for round glass rod 266. Alternatively, the supporting face of plate 270 may constitute a V-shaped groove for supporting rod 266. As shown in FIG. 15, when the supporting face of plate 270 is a circular recess of the same curve as the curved surface of rod 266, the supporting face of plate 270 can contact rod 266 more effectively.

Figure 17:
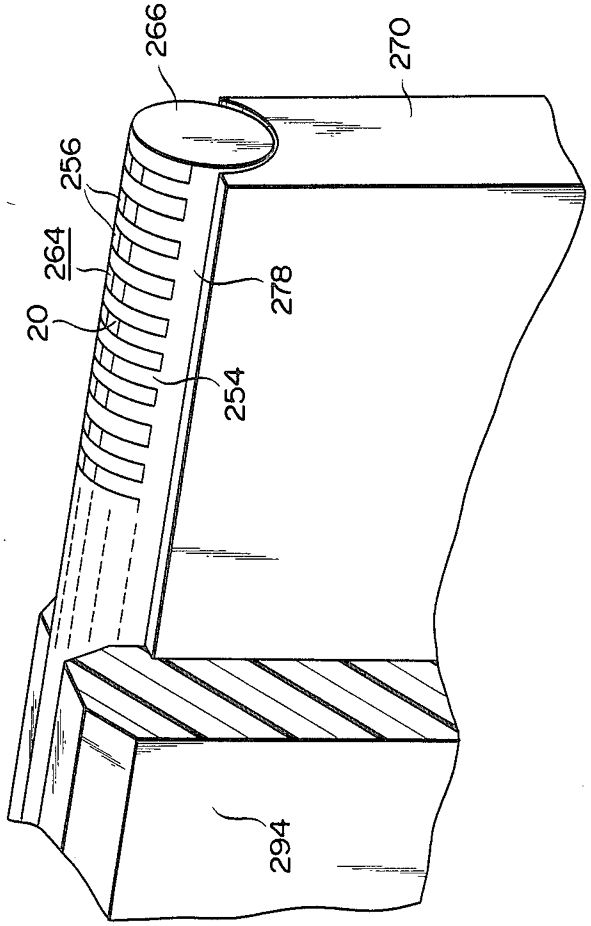
FIG. 17 is a partially sectional perspective view for schematically showing the thermal head shown in FIG. 14 from a different direction.

Driving power source side electrodes 254 on the opposite side of drive signal side electrodes 256 can be commonly used. Therefore, in thermal head 10 according to the present invention, driving power source side electrodes 254 extend at thin patterns for a predetermined distance defined by heating elements 20, and the distal end portions thereof are connected with each other, thereby forming common pattern 278, as shown in FIG. 17. Pattern 278 constitutes a pattern along the circumference of rod 266 to be in contact with aluminum plate 270. Therefore, the heat generated by heating elements 20 is transmitted to rod 266 and, simultaneously, to driving power source side electrodes 254 and common pattern 278 following a predetermined delay.

More specifically, the heat transmitted to electrodes 254 and common pattern 278 from rod 266 is readily transmitted and diffused through their surfaces contacting plate 270. Therefore, the temperature of rod 266 does not increase greatly, and the non-uniformity in the temperature can be made small, thereby greatly decreasing the printing non-uniformity mentioned earlier.

Thermal head 10 of the present invention uses round glass rod 266 at its distal end. Therefore, recording sheet 28 can be removed quickly therefrom after printing, compared with a case wherein head 10 has a flat distal end face.

Figure 18:
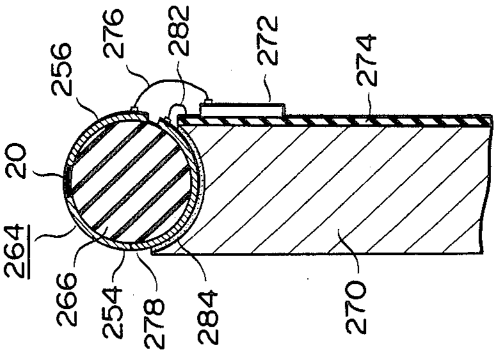
FIG. 18 is a schematic sectional view of the thermal head shown in FIG. 14.

FIG. 18 is a schematic cross-sectional view of thermal head 10 of the present invention. Common pattern 278 is formed along the circumference of rod 266 to be in contact with aluminum plate 270. Pattern 278 is arranged close to the distal ends of drive signal side electrodes 256, as shown in FIG. 18. Pattern 278 is connected to a driving power source pattern (FIG. 14) on glass epoxy resin substrate 274 via connection wires 282. In this manner, a drive signal or power can be supplied from a single substrate 274. In FIG. 18, reference numeral 284 denotes an adhesive, having a good heat conductivity, for adhering rod 266 and plate 270.

As described above, the driving power source side electrodes are divided into two groups, i.e., electrodes 254 consisting of a thin pattern having substantially the same width as heating elements 20, and wide common pattern 278. Therefore, the resistance between elements 20 and plate 270 can be changed by changing the length and thickness of thin electrodes 254. In other words, a given heat resistance can be provided by properly selecting the thickness, length, and width of electrodes 254 consisting of the thin pattern.

Figure 19:
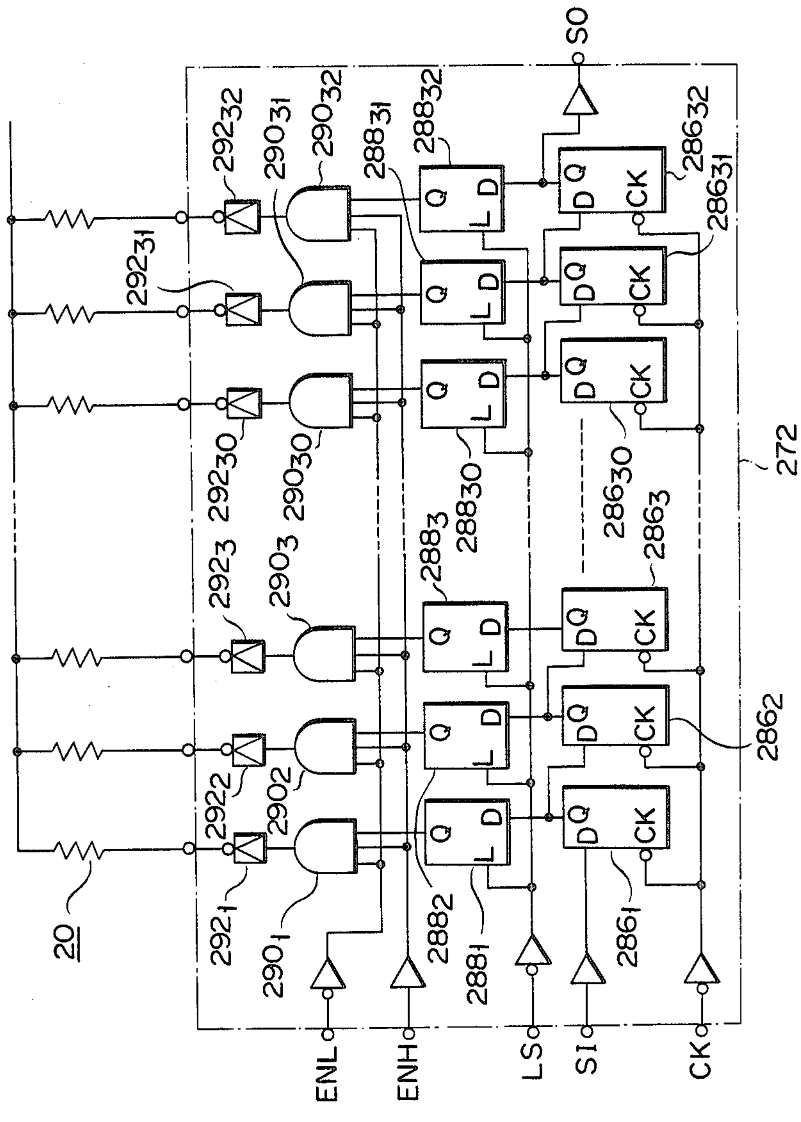
FIG. 19 is a circuit diagram of a driver circuit incorporated in the driver IC of the thermal head shown in FIG. 14.

Each of driver ICs 272 has a circuit configuration as shown in FIG. 19. Each driver IC 272 can drive 32 heating elements 20. Thermal head 10 of the present invention divisionally drives groups of 54 driver ICs 272. More specifically, each driver IC 272 consists of 32 D flip-flops $286_1$ to $286_{32}$, latch circuits $288_1$ to $288_{32}$, and circuits $290_1$ to $290_{32}$, and drivers $292_1$ to $292_{32}$. Clock signal CK is supplied to clock input terminal CK of D flip-flop $286_1$ through a buffer, and input signal SI is supplied to input terminal D thereof through another buffer. An output signal from output terminal Q of D flip-flop $286_1$ is supplied to input terminal D of next D flip-flop $286_2$ and, simultaneously, to input terminal D of latch circuit $288_1$. Latch signal LS is inverted and supplied to latch input terminal L of circuit $288_1$ through a buffer. The output signal from output terminal Q of circuit $288_1$ is supplied to AND circuit $290_1$. Enable high signal ENH and inverted enable low signal ENL are also supplied to circuit $290_1$ through a buffer. The output from circuit $290_1$ is supplied to driver $292_1$.

In subsequent D flip-flops $286_2$ to $286_{31}$, clock signal CK is supplied to their respective clock input terminals CK through the buffer, in the same manner as in D flip-flop $286_1$. An output signal from output terminal Q of each of D flip-flops $286_1$ to $286_{30}$ of former stages is supplied to each input terminal D. The output signal from output terminal Q of each of D flip-flops $286_2$ to $286_{31}$ is supplied to input terminal D of each of D flip-flops $286_3$ to $286_{32}$ of the subsequent stages. Clock signal CK is supplied to clock input terminal CK of final D flip-flop $286_{32}$ through the buffer. An output signal from output terminal Q of final D flip-flop $286_{32}$ is output as signal SO to be supplied to driver IC 272 of the next stage through a buffer.

Latch circuits $288_2$ to $288_{32}$, AND circuits $290_2$ to $290_{32}$, and drivers $292_2$ to $292_{32}$ are similar to latch circuit $288_1$, AND circuit $290_1$, and driver $292_1$ except that input terminal D of each latch circuit receives an output signal from a corresponding D flip-flop.

Figure 16:
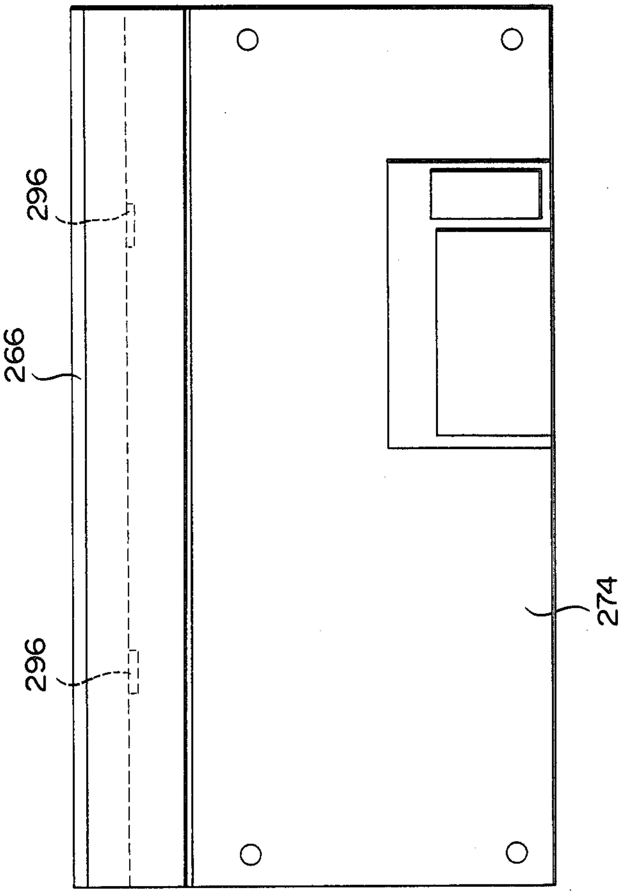
FIG. 16 is a schematic plan view of the thermal head shown in FIG. 14.

Driver ICs 272 and connecting wires 276 and 282 are molded by protection layer 294 of a synthetic resin, as shown in FIGS. 14 to 16.

Figure 20:
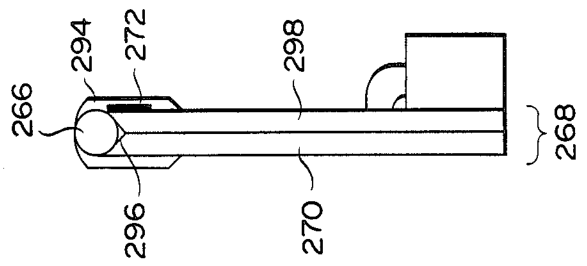
FIG. 20 is a schematic side view of a thermal head according to another embodiment of the present invention.

As shown in FIGS. 15 and 16, thermal head 10 used in the present invention has thermistors 296 as temperature-detecting elements. Thermistors 296 are mounted between a supporting face of support member 268 which is of V-shaped or circularly recessed at the same curve as the curved surface of round glass rod 266. Therefore, since the correct temperature of rod 266 can be detected, the temperature of thermal head 10 can be kept at a constant value by only slightly changing the current supplied to heating elements 20. This temperature control in accordance with temperature detection by a thermistor is widely known, and will not be described here. Note that support member 268 can be formed by adhering aluminum plate 270 and glass epoxy resin plate 298, as shown in FIG. 20. Alternatively, ICs 272 can be placed on a thin substrate made of polyimide or the like, and adhered to a thick substrate, thereby providing a support member.

Figure 21:
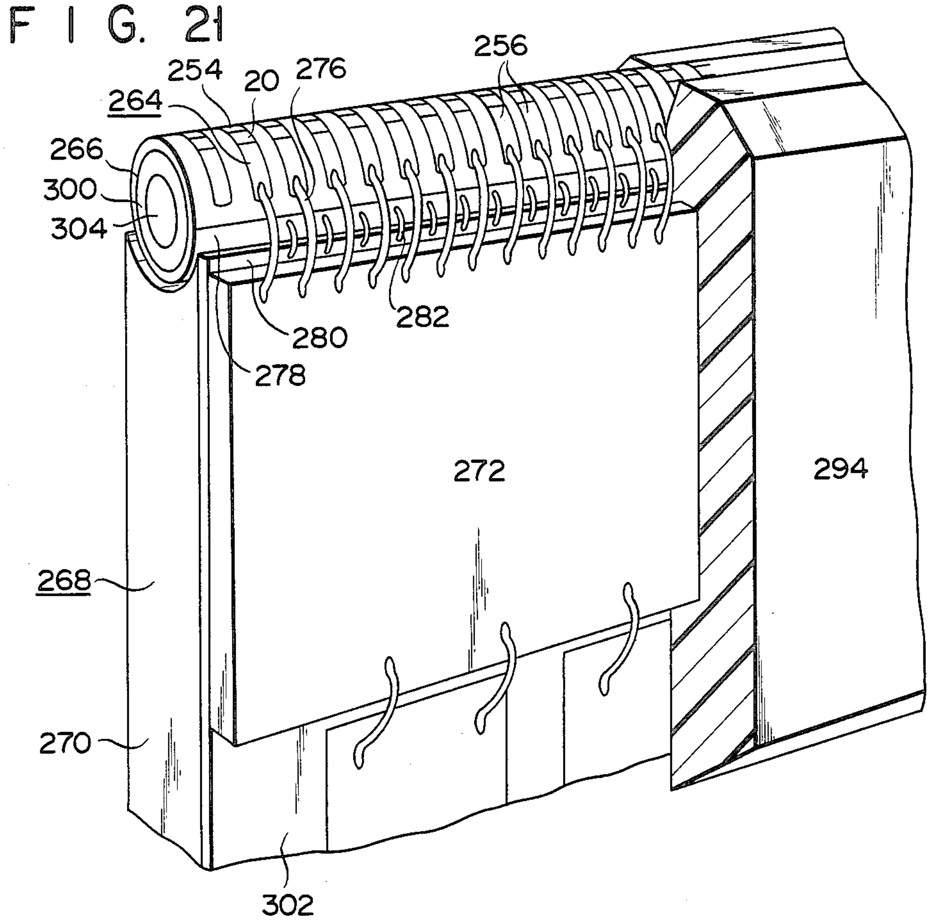
FIG. 21 is a partially sectional perspective view for schematically showing a thermal head according to further embodiment of the present invention.
Figure 22:
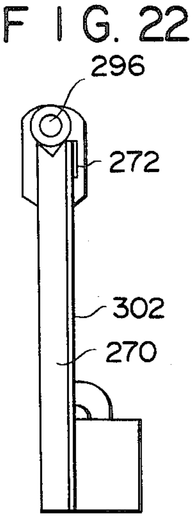
FIG. 22 is a schematic side view of the thermal head shown in FIG. 21.
Figure 23:
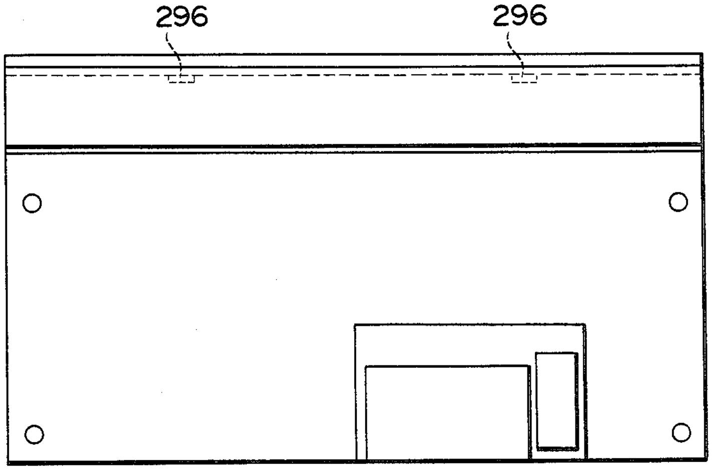
FIG. 23 is a schematic plan view of the thermal head shown in FIG. 21.

FIGS. 21 to 23 show thermal head 10 according to further embodiment of the present invention. Thermal head 10 is formed on aluminum tube 300 which is glass-glazed and which has a good heat conductivity. Tube 300 is adhered to the end face of support member 268. Thermal head 10 is thus an end-face type head. Support member 268 is obtained by adhering polyimide substrate 302 to aluminum plate 270. Substrate 302 has driver ICs 272 for driving heating elements 20 and wirings for supplying power. In this case, tube 300 and plate 270 have very good heat conductivities, so that heat accumulation substantially does not occur, resulting in no change in the temperature during continuous printing. Since plate 270 is located immediately under substrate 302, it can serve as a heat sink of driver ICs 272.

Thermistors 296 are provided in hollow space 304 in tube 300. With this arrangement, the heat conduction from heating elements 20 to thermistors 296 is improved. More specifically, a temperature increase due to abrupt heat generation caused by a change in ambient atmosphere or printing of a large area such as a solid area is detected by thermistors 296. Therefore, when the current to be supplied to heating elements 20 is controlled in accordance with the change in the resistance of thermistors 296 depending on the temperature, optimal printing can be maintained.

Figure 24:
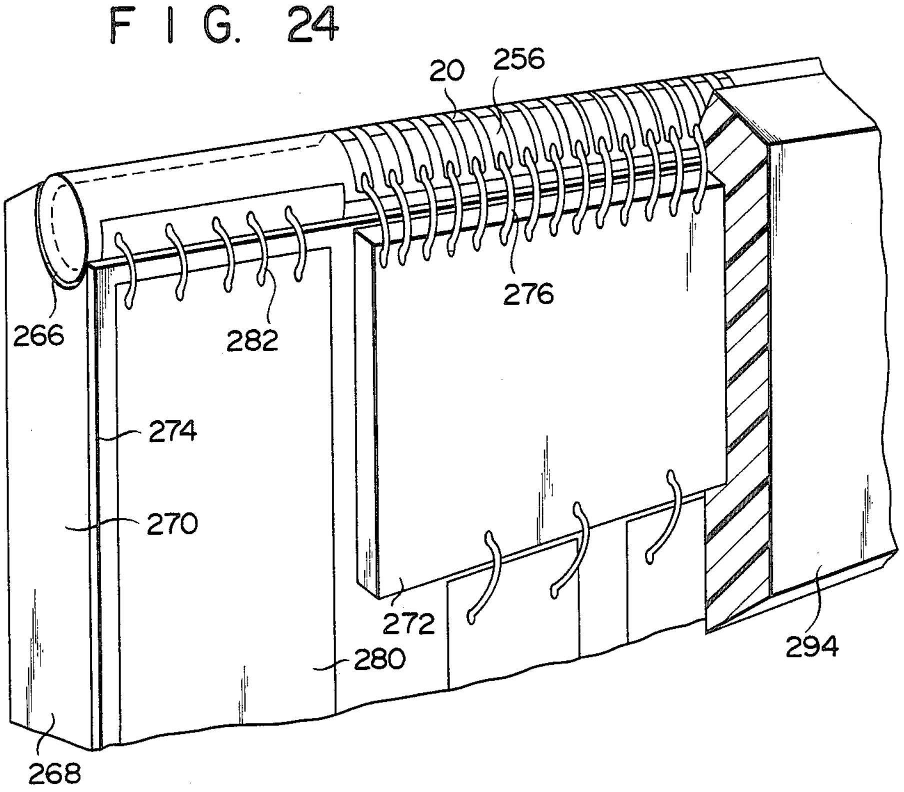
FIG. 24 is a partially sectional perspective view for schematically showing a thermal head according to still another embodiment of the present invention.
Figure 25:
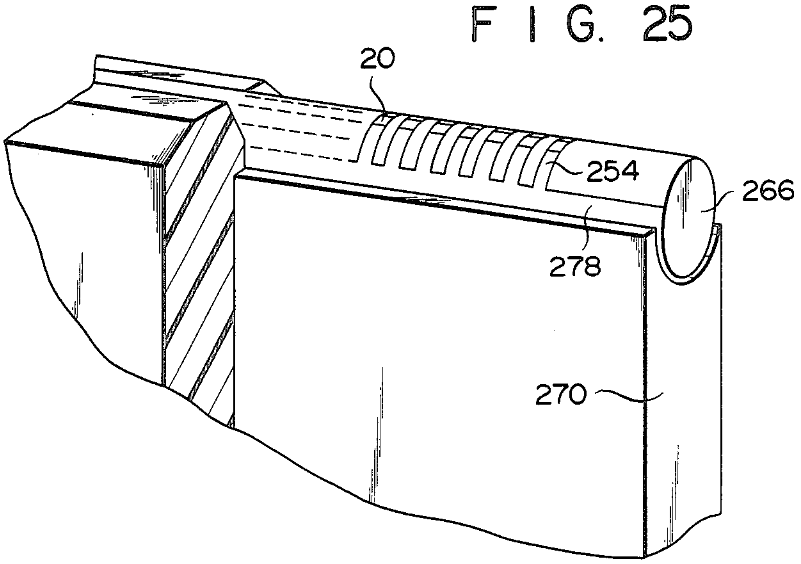
FIG. 25 is a partially sectional perspective view for schematically showing the thermal head shown in FIG. 24 from a different direction.

FIGS. 24 and 25 show still another embodiment of the present invention. In this case, thermal head 10 has common electrode 278 which extends outside the range of heating elements 20 and is connected to driving power source pattern 280 mounted on glass epoxy resin substrate 274. Extended common electrode 278 is passed under the lower surface of round glass rod 266 and is exposed to the side of driving power source pattern 280. Electrode 278 is then connected to driving power source pattern 280 at this side via connecting wires 282.

As described above, according to the present invention, a rod-like member is used so that manufacture of the overall system is easy and inexpensive in terms of materials. Since thermal head 10 need not be polished to obtain flatness, the overall system becomes less expensive. In thermal head 10 of the present invention, round glass rod 266 having heating elements 20 and aluminum plate 270 as a heat conductive member are in tight contact with each other. In addition, the heat generated by heating elements 20 on rod 266 is conducted to plate 270 as the heat conductive member through connection electrodes of heating element 20 of an adequate heat resistance. As a result, heat accumulation is prevented, thereby allowing high-quality, uniform printing.

Thermal head 10 of the present invention is of an end-face type so that a sufficient space is allowed therearound. As a result, the porous film of the thermal ink-jet printing device or the film of the thermal transfer printing device can be made into a cassette, thereby simplifying handling of the overall system. Since only one substrate is needed for mounting driver ICs 272 thereon, manufacturing cost is decreased, and no particular step is required for power supply, resulting in only a one-surface bonding step.

In addition, correct temperature control can be performed so that the printing quality is improved.

The above embodiments exemplify thermal heads adopted in bubble-type ink-jet recording devices. However, the present invention is not limited to this, and can be applied to a thermal color printer and a thermal transfer printer.

Various changes and modifications can be made within the spirit and scope of the present invention.

What is claimed is:

1. A thermal printing head, comprising:

a rod-like member having a cylindrical surface and a central axis;

a heating element array consisting of a plurality of heating elements arranged on said rod-like member along the axial direction thereof;

first electrodes arranged on said rod-like member, each of said first electrodes being connected to a corresponding one of said heating elements in said heating element array and extending in a first circumferential direction along said cylindrical surface of said rod-like member;

second electrodes arranged on said rod-like member, each of said second electrodes being connected to a corresponding one of said heating elements in said heating element array circumferentially opposite said first electrodes so that each of said heating elements is disposed circumferentially between one of said first electrodes and one of said second electrodes, each of said second electrodes extending in a second circumferential direction opposite said first circumferential direction along said cylindrical surface of said rod-like member; and a common pattern commonly connecting said second electrodes and extending from said second electrodes in said second circumferential direction along said cylindrical surface of said rod-like member to a circumferentially distal edge proximate said first electrodes, said interconnected first electrodes, heating elements, second electrodes, and common pattern substantially encircling said rod-like member.

2. A thermal head according to claim 1, wherein said common pattern is connected to a driving power source.

3. A thermal printing head, comprising:

a rod-like member having a cylindrical surface and a central axis;

a support member having recessed end portion for receiving a sector of said rod-like member;

a heating element array including a plurality of heating elements provided on said cylindrical surface of said rod-like member diametrically opposite said sector received in said end portion of said support member, said heating elements being arranged along the axial direction of said rod-like member;

first electrodes arranged on said rod-like member for applying a drive voltage to said heating elements, each of said first electrodes being connected to a corresponding one of said heating elements in said heating element array and extending in a first circumferential direction along said cylindrical surface of said rod-like member;

second electrodes arranged on said rod-like member, each of said second electrodes being connected to a corresponding one of said heating elements in said heating element array circumferentially opposite said first electrodes so that each of said heating elements is disposed circumferentially between one of said first electrodes and one of said second electrodes, each of said second electrodes extending in a second circumferential direction opposite said first circumferential direction along said cylindrical surface of said rod-like member;

a common pattern commonly connecting said second electrodes, extending from said second electrodes in said second circumferential direction along said cylindrical surface of said rod-like member to cover said sector received in said end portion of said support member, and terminating in a circumferentially distal edge proximate said first electrodes; and a drive section, provided on said support member, for selectively driving each of said heating elements in said heating element array, said drive section having a connection side adjacent said recessed end portion of said support element and extending in the axial direction of said rod-like member, said drive section being connected to said common pattern and said first electrodes at said connection side.

4. The thermal head according to claim 3, wherein said thermal head further comprises a temperature detecting element, provided in the vicinity of said rod-like member, for detecting a temperature.

5. The thermal head according to claim 4, wherein said temperature detecting element is provided between said rod-like member and said support member.

6. The thermal head according to claim 5, wherein said temperature detecting element comprises a thermistor.

7. The thermal head according to claim 4, wherein said rod-like member has a hollow portion and said temperature detecting element is provided in said hollow portion of said rod-like member.

8. The thermal head according to claim 7, wherein said temperature detecting element comprises a thermistor.

9. The thermal head according to claim 3, wherein said support member is made of a material having a good heat conductivity and said rod-like member is mounted on said support member by an adhesive having a good heat conductivity.

10. The thermal head according to claim 9, wherein said support member comprises an aluminum plate.

11. The thermal head according to claim 10, wherein said support member is obtained by adhering said aluminum plate and a glass epoxy substrate, and said drive section is arranged on said glass epoxy substrate.

12. The thermal head according to claim 10, wherein said support member is obtained by adhering said aluminum plate and a polyimide substrate, and said drive section is arranged on said polyimide substrate.

13. A thermal printing head, comprising:

a rod-like member having a cylindrical surface and a central axis, said rod-like member including an end portion of a preselected axial length adjacent one axial end thereof;

a support member having a recessed end portion for receiving a sector of said rod-like member;

a heating element array including a plurality of heating elements provided on said cylindrical surface of said rod-like member diametrically opposite said sector received in said end portion of said support member, said heating elements being arranged along the axial direction of said rod-like member and being excluded from said end portion thereof;

first electrodes arranged on said rod-like member for applying a drive voltage to said heating element, each of said first electrodes being connected to a corresponding one of said heating elements in said heating element array and extending in a first circumferential direction along said cylindrical surface of said rod-like member;

second electrodes arranged on said rod-like member, each of said second electrodes being connected to a corresponding one of said heating elements in said heating element array circumferentially opposite said first electrodes so that each of said heating elements is disposed circumferentially between one of said first electrodes and one of said second electrodes, each of said second electrodes extending in a second circumferential direction opposite said first circumferential direction along said cylindrical surface of said rod-like member;

a common pattern commonly connecting said second electrodes, extending from said second electrodes in said second circumferential direction along said cylindrical surface of said rod-like member to cover said sector received in said end portion of said support member, and terminating in a circumferentially distal edge proximate said first electrodes, said common pattern including a portion extending axially along said end portion of said rod-like member; and a drive section, provided on said support member, for selectively driving each of said heating elements in said heating element array, said drive section having a connection side adjacent said recessed end portion of said support element and extending in the axial direction of said rod-like member, said drive section being connected to said first electrodes at said connection side, said drive section also having a driving power source pattern provided on said support member and connected to said portion of said common pattern extending along said end portion of said rod-like member.

* * * * *